Feb. 2, 1926.
H. A. POWELL
1,571,432
ANIMAL TRAP
Filed June 2, 1925
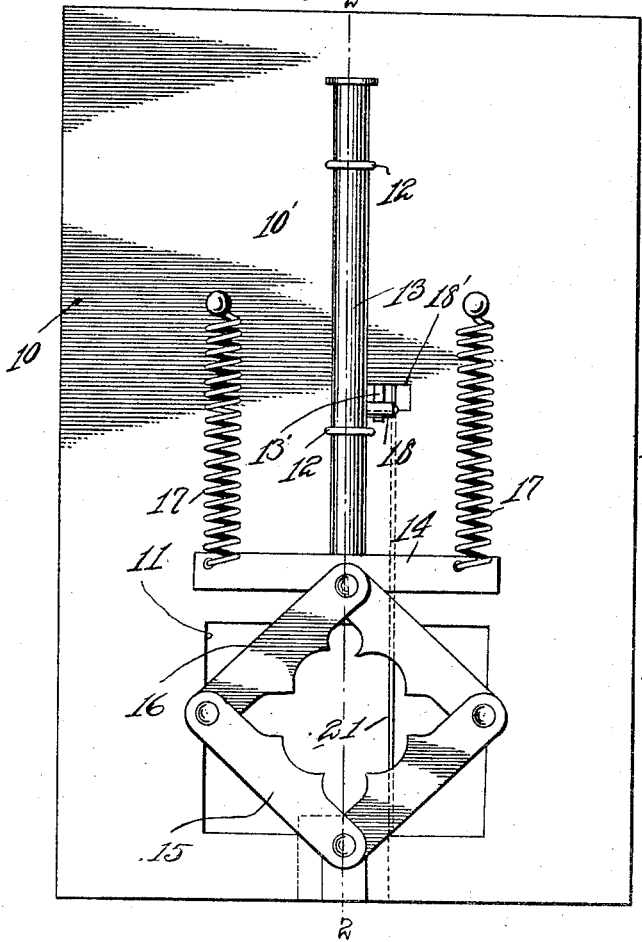
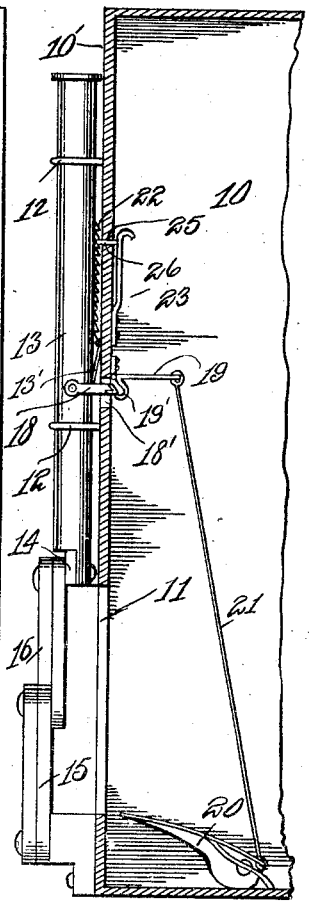
Inventor
H. A. Powell.
By
Attorney Patented Feb. 2, 1926.

1,571,432

UNITED STATES PATENT OFFICE.

HARVEY A. POWELL, OF HALEYVILLE, ALABAMA.

ANIMAL TRAP.

Application filed June 2, 1925. Serial No. 34,372.

*To all whom it may concern:*

Be it known that I, HARVEY A. POWELL, a citizen of the United States, residing at Haleyville, in the county of Winston, State of Alabama, have invented certain new and useful Improvements in Animal Traps; and I do hereby declare the following to be a full, clear, and exact description of the invention, such as will enable others skilled in the art to which it appertains to make and use the same.

This invention relates to new and useful improvements in animal traps, and particularly to traps for catching rodents.

One object of the invention is to provide a trap which is simple in construction, positive in operation, and which is easy to set.

Another object is to provide a trap of this character wherein the animal is squeezed within the confines of a jaw frame, and whereby such frame, when in gripping position with relation to an animal, cannot be opened, to permit the animal to escape.

Other objects and advantages will be apparent from the following description when taken in connection with the accompanying drawing.

In the drawing:

Figure 1 is a front elevation of a trap made in accordance with the present invention, and in set position.

Figure 2 is a vertical sectional view on the line 2—2 of Figure 1.

Referring particularly to the accompanying drawing, 10 represents a portion of a suitable box or housing in the end wall 10' of which is formed an opening 11, for the animal to pass through, and be caught in the jaws of the trap, as will be explained more clearly hereinafter. Slidable vertically on said wall 10', above the opening 11, and guided in the loops 12, is a bar or rod 13, and secured to the lower end of the rod, and extending transversely thereof, is a bar 14. Disposed across the opening 11 is a rectangular frame comprising the pivotally connected links 15 and 16, the former of which is pivotally connected to the wall 10', at the lower side of the opening 11, while the latter are pivotally connected to the adjacent end of the rod 13. Connected to the opposite ends of the transverse bar 14, and to the said end wall 10', at a distance above said opening 11, are the strong coil springs 17, which normally urge the rod upwardly to collapse the rectangular frame 15—16, and squeeze the animal within the confines thereof. Pivoted on one side of the bar or rod 13, and extending into an opening 18' in said wall 10, is an arm 18, and pivotally supported on the end wall 10', with its inner end formed with a hook 19' to engage with the free end of said arm, and the rod 13, against movement in one direction, is a rocker 19. Rearwardly of the opening 11, within the box 10, there is arranged a pivotally mounted and spring pressed platform 20, on which the animal steps, when attempting to pass through the collapsible frame 15—16. Connected at one end to one end of the platform 20, and at its other end to the other end of the rocker 19, is a wire or link 21, whereby when the animal depresses the platform, the rocker 19 will be moved out of engagement with the arm 18, so that the springs 17 will quickly slide the rod 13 upwardly to close the frame and confine the animal therein.

Secured to the front face of the wall 10, and extending downwardly against the upper edge face of the arm 18, is a stop member 13', which maintains the arm 18 against upward movement under the influence of the springs 17. Thus the collapsible frame and rod 13 are held in set position until an animal engages its weight on the platform 20 so as to rock the arm 19 and release its hooked end from the arm 18.

On the rear face of the rod 13, or that face lying adjacent the wall 10', are formed the ratchet teeth 22, with which is engaged the spring pawl 23, mounted on the wall and having its nose 26 extending through an opening 25, in said wall. Thus, after the animal has sprung the trap, and is confined within the frame 15—16, all efforts of the animal to spread the frame, in an attempt to escape, is prevented, by the engagement of the pawl 23 with the teeth 22, of the bar 13. It will, of course, be understood that this pawl 23 must be released from the ratchet teeth when the trap is to be set.

While I have shown a single rectangular frame 15—16, it will be readily understood that a number of such frames may be placed on the end wall of a single box, with a corresponding number of openings in said wall, and each frame having its individual operating mechanism, thus enabling the owner to catch a number of animals in one trap.

What is claimed is:

1. An animal trap including a housing having an opening, a frame disposed opposite the opening and including pivotally connected links, one of the pivotal connections being movably connected to the housing, a rod slidable on the housing and pivotally connected to another pivotal connection of the frame, means for normally urging the frame into collapsed position, trip means for holding the frame in open position, and a detent engaging with the rod for holding the frame in collapsed position after the trap has been sprung.

2. An animal trap including a housing having an opening, a rectangular frame disposed opposite the opening and including pivotally connected links, one of the said pivotal connections being movably connected to the housing at one side of said opening, a rod slidable on the housing and pivotally connected with the diametrically opposite corner of said frame, spring means connected to the rod for normally urging the frame into collapsed position, trip means for holding the frame in open position, and a detent engaging with the rod for holding the frame in collapsed position after the trap has been sprung.

3. An animal trap including a housing having an opening in an end wall, a rectangular frame composed of pivotally connected links disposed opposite said opening, one of the corners of said frame being pivotally connected to said wall at one side of the opening thereof, a slidable rod pivotally connected to the diametrically opposite corner of the frame, a transverse bar connected to the rod adjacent the opening, springs connected to the ends of the transverse bar and said wall, ratchet teeth on the rod, a trip for engagement with the rod, and a detent engaged with the teeth to prevent opening movement of the link frame after said frame has been collapsed about an animal.

In testimony whereof, I affix my signature.

HARVEY A. POWELL.